US 6,595,055 B1

United States Patent
Schenk et al.

(10) Patent No.: US 6,595,055 B1
(45) Date of Patent: Jul. 22, 2003

(54) MICROMECHANICAL COMPONENT COMPRISING AN OSCILLATING BODY

(75) Inventors: Harald Schenk, Dresden (DE); Peter Duerr, Dresden (DE); Heinz Kueck, Stuttgart (DE)

(73) Assignee: Fraunhofer-Gesellschaft zur Foerderung der Angewandten, Munich (DE)

( * ) Notice: Subject to any disclaimer, the term of this patent is extended or adjusted under 35 U.S.C. 154(b) by 0 days.

(21) Appl. No.: 09/786,655
(22) PCT Filed: Dec. 15, 1998
(86) PCT No.: PCT/EP98/08204
§ 371 (c)(1), (2), (4) Date: May 21, 2001
(87) PCT Pub. No.: WO00/25170
PCT Pub. Date: May 4, 2000

(30) Foreign Application Priority Data
Oct. 28, 1998 (DE) .......................... 198 49 725
(51) Int. Cl.⁷ .................. G01P 15/00; G02B 26/08
(52) U.S. Cl. ................. 73/514.15; 73/514.26; 73/514.32; 73/514.37; 359/213
(58) Field of Search ............... 73/514.15, 514.26, 73/514.29, 514.32, 514.36, 514.37; 359/213, 214, 221

(56) References Cited

U.S. PATENT DOCUMENTS 4,566,935 A * 1/1986 Hornbeck ............... 438/29
4,699,006 A * 10/1987 Boxenhorn ........... 73/514.15
5,061,049 A * 10/1991 Hornbeck .............. 359/224

FOREIGN PATENT DOCUMENTS

DE 42 24 601 A1 1/1994
GB 2 275 787 A 9/1994

OTHER PUBLICATIONS

Fischer et al., "Electrostatically deflectable polysilicon torsional mirrors," Sensors and Actuators—A Physical A 44, Elsevier Sciences S.A. (Lausanne, CH), No. 1, p. 83–88.
Larry J. Hornbeck, "Deformable–Mirror Spatial Light Modulators," Spatial Light Modulators and Applications III, SPIE Critical Reviews Series (San Diego, CA), p. 86–102 (Aug. 7–8, 1989).

* cited by examiner

Primary Examiner—Richard A. Moller
(74) Attorney, Agent, or Firm—Michael A. Glenn; Glen Patent Group

(57) ABSTRACT

A micromechanical component comprises a frame layer and an oscillating body which, with the aid of a suspension means, is supported in an opening penetrating the frame layer, in such a way that the oscillating body is adapted to be pivoted about an axis of oscillation vertically to the frame layer plane. At least one oscillating-body lateral surface, which extends substantially at right angles to the frame layer plane, is arranged in relation to at least one inner lateral surface of the opening in such a way that a capacitance formed therebetween is varied by an oscillation of the oscillating body in such a way that an oscillation of the oscillating body about the axis of oscillation can be generated by periodically varying a voltage applied between the frame layer and the oscillating body. A supporting substrate for holding the frame layer is provided, said supporting substrate being implemented such that, in comparison with the influence of the voltage applied between the frame layer and the oscillating body, said supporting substrate has a negligible physical influence on the generation of the oscillation of the oscillating body.

18 Claims, 3 Drawing Sheets

MICROMECHANICAL COMPONENT COMPRISING AN OSCILLATING BODY

FIELD OF THE INVENTION

The present invention relates to a micromechanical component comprising a movable portion which can be caused to carry out resonant oscillations, i.e. an oscillating body. In particular, the present invention relates to micromechanical components of such a nature that an oscillation of the oscillating body out of the chip plane, i.e. vertically to the chip plane, is produced.

DESCRIPTION OF PRIOR ART

The functionality of certain micromechanical actuators, e.g. actuators designed to deflect of light, is based on the deflection of a movable element out of the chip plane. The movable element is connected to the rest of the chip via a bending or torsion spring. In order to achieve deflection, it is, on the one hand, known to implement the movable part as an electrode and to use a suitable counterelectrode so that the actuator will be driven by an electric torque. On the other hand, it is known to provide the movable part in the chip plane with conducting tracks in the form of a coil so that, when current flows through the conducting tracks in the magnetic field, a magnetic torque can be used for the purpose of driving.

In many micromechanical components the counterelectrode is arranged below the movable electrode so that, upon application of a voltage, an electric torque can be used for deflection from the chip plane. For producing such components, two fundamental approaches to a solution exist.

According to the first approach, the substrate, which can serve as a counterelectrode itself, or a counterelectrode structured from metal and arranged on the substrate has first applied thereto a sacrificial layer consisting e.g. of silicon dioxide or of a photoresist. On this sacrificial layer the movable electrode is then formed making use of a suitable conductive material, e.g. aluminium or a heavily doped polysilicon. Finally, the sacrificial layer is removed. M. Fischer describes e.g. in "Electrostatically deflectable polysilicon torsional mirrors" in Sensor and Actuators A 44 (1994), pp. 83 et seq., a method in which the silicon substrate defines the counterelectrode, the sacrificial layer consists of silicon and the movable electrode is produced from heavily doped polysilicon. In the case of this method the electrode gap is determined by the thickness of the sacrificial layer so that electrode gaps having an arbitrary size cannot be realized by means of this method or similar methods. Hence, actuators having large lateral dimensions and a large deflection angle cannot be produced.

The second fundamental approach to a solution is based on a hybrid set-up. According to this approach, the counterelectrode and the movable part are produced separately from one another and combined towards the end of the production process. For example, H. Löwe describes e.g. in "Meßtechnische Anforderungen bei der Herstellung von Silizium-Mikrospiegeln" in Sensor 95 (congress volume), pp. 631 et seq., a set-up comprising a silicon frame in which the movable part is supported and a supporting plate which includes the counterelectrode. By means of this approach to a solution large electrode gaps can be realized. This approach to a solution entails, however, the disadvantage that suitably high driving voltages are required. In addition, the separate production of the micromechanical structure and of the supporting plate make the process complicated and expensive.

In the above-mentioned components, in which the counterelectrode is arranged below the movable electrode, the amplitude of the oscillation of the movable part can, of course, not exceed the size of the electrode gap. When a larger electrode gap is used for increasing the amplitude, it will, on the other hand, also be necessary to increase the driving voltage so as to be able to couple in the necessary energy per oscillation cycle. It is therefore not possible to achieve by means of this set-up a large amplitude making use of low driving voltages.

S. Miller describes e.g. in "Scaling Torsional Cantilevers for Scanning Probe Microscope Arrays: Theory and Experiment"; in Transducers '97 (1997) pp. 445 et seq., a set-up in the case of which the movable part of the micromechanical component can be deflected out of the chip plane without making use of a counterelectrode which is arranged below the movable electrode. The set-up described in this publication is provided with a pivotably supported cantilever which can be driven by capacitive actuators. The cantilever is provided with a plurality of interdigitated electrodes for this purpose. These movable interdigitated electrodes define together with the fixed interdigitated electrodes the capacitive actuators which take advantage of the so-called electrostatic comb drive levitation effect. In the case of this effect, a vertically asymmetric field acts on the movable electrodes and this results in a vertical force which causes the movable electrodes and, consequently, the movable cantilever to move away from the substrate. This effect can be utilized for causing static displacements as well as oscillations of the cantilever. In order to achieve the asymmetric field distribution, which causes the cantilever to move out of the chip plane, it will always be necessary that a substrate is provided adjacent the arrangement described, since, neglecting manufacturing tolerances, a torque permitting a deflection out of the chip plane would otherwise not exist. Only the existence of the substrate changes, when there is a suitable potential distribution, the field pattern such that a vertical force component will be created, which can be used for the purpose of deflection. It follows that a small distance between the movable electrodes and the substrate is here again of essential importance so as to permit the utilization of fringe effects which is required for a movement at right angles to the chip plane. Large amplitudes in the case of large lateral dimensions of the movable element can therefore not be achieved in this case either.

N. Asada describes in "Silicon Micromachined Two-Dimensional Galvano Optical Scanner" in IEEE Transactions on Magnetics (30) 6 (1994), pp. 4647 et seq., a drive principle making use of a magnetic moment. According to this principle, the movable element of a torsional actuator has laterally applied thereto coil-shaped conducting tracks so that a magnetic torque which can be used for driving will be generated in response to a flow of current in the magnetic field. This drive principle avoids the limitation of the amplitude caused by the geometry of the electrodes. The torque that can be realized by the magnetic moment is, however, only low so that even in the case of resonance only amplitudes of less than 3° are achieved. In addition, the set-up is comparatively complicated and expensive due to the use of a separately manufactured permanent magnet.

SUMMARY OF THE INVENTION

It is the object of the present invention to provide a micromechanical component with an oscillating body which, making use of low voltages, permits a large deflection of the oscillating body out of the chip plane.

This object is achieved by a micromechanical component comprising a frame layer and an oscillating body which, with the aid of a suspension means, is supported in an opening penetrating the frame layer, in such a way that the oscillating body is adapted to be pivoted about an axis of oscillation vertically to the frame layer plane. At least one oscillating-body lateral surface, which extends substantially at right angles to the frame layer plane, is arranged in relation to at least one inner lateral surface of the opening in such a way that a capacitance formed therebetween is varied by an oscillation of the oscillating body in such a way that an oscillation of the oscillating body about the axis of oscillation can be generated by periodically varying a voltage applied between the frame layer and the oscillating body. In addition, a supporting substrate for holding the frame layer is provided, the supporting substrate being implemented such that, in comparison with the influence of the voltage applied between the frame layer and the oscillating body, the supporting substrate has a negligible physical influence on the generation of the oscillation of the oscillating body.

The micromechanical component according to the present invention is based on a new kind of electrostatic drive principle permitting the generation of resonant bending and torsional oscillations of movable parts of micromechanical components, the movement of the oscillating body taking place out of the chip plane and the achievable amplitude being not limited by a counterelectrode. In the case of this drive principle the inner lateral surface of the frame layer, in which the oscillating body is supported, serves as a counterelectrode; this inner lateral surface is arranged directly adjacent a lateral surface of the oscillating body serving as a movable electrode so that a kind of plate capacitor is obtained, which is defined by the opposed lateral surfaces. The electric field extends therefore parallel to the chip plane.

The coupling in of energy required for the oscillation of the oscillating body takes place via this capacitance. The coupling in of energy is effected by applying a voltage between the movable electrode and the counterelectrode, the electric voltage being increased and reduced preferably in such a way that energy averaged over an oscillating period can be coupled in. The electric voltage applied between the movable electrode and the counterelectrode is reduced or switched off preferably during the zero passage or directly adjacent the zero passage of the oscillation. This zero passage is preferably detected by an optical method, by detecting the charge/discharge current of the deflection-angle dependent capacitance or by determining the deflection-angle dependent capacitance.

In order to facilitate an oscillation build-up of the oscillating body, asymmetries produced by the manufacturing process or by arranging a further electrode above the counterelectrode may be provided so that a periodic torque causing the oscillating body to oscillate will be generated when an electric voltage having a suitable frequency is applied. The energy which can be coupled in increases as the deflection decreases. When the respective zero passage is detected and when a generator is synchronized therewith, the system is excited at its resonant frequency with the optimum phase position. It follows that, according to the present invention, electrodes restricting the oscillation amplitude due to geometrical reasons can be dispensed with completely. Furthermore, the component according to the present invention can be produced easily making use of known methods in the field of surface mechanics.

It follows that the present invention provides a micromechanical component having a simple structural design and permitting a large deflection of the oscillating body making use of a comparatively low drive voltage. These advantages are achieved according to the present invention, since one or a plurality of lateral surfaces of the oscillating body, which serve as a movable electrode and which are arranged at right angles to the plane of the supporting substrate, co-operate with one or a plurality of inner lateral surfaces of the opening in the frame layer in which the oscillating body is supported so as to permit an oscillation of the oscillating body, an underlying substrate surface, which would restrict the oscillation amplitude, being not required.

BRIEF DESCRIPTION OF THE DRAWINGS

In the following, preferred embodiments of the present invention will be explained in detail making reference to the drawings enclosed, in which.

DESCRIPTION OF PREFERRED
EMBODIMENTS OF THE INVENTION

Figure 1:
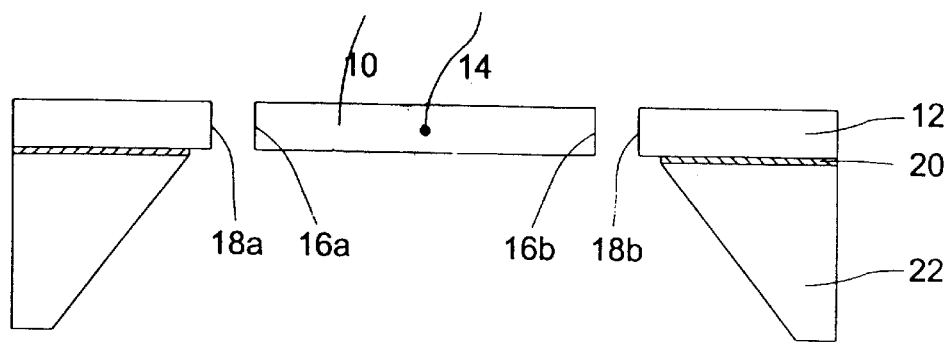
FIG. 1 shows a schematic cross-sectional view of an embodiment of the micromechanical component according to the present invention, the oscillating body being at the position of rest.

As can be seen from FIG. 1, the micromechanical component according to the present invention comprises an oscillating body 10, a frame layer 12 and a suspension device 14. The oscillating body 10, the frame layer 12 and the suspension device 14 are preferably formed integrally from a silicon layer. This silicon layer is structured such that it is provided with an opening in which the oscillating body 10 is arranged, the oscillating body 10 being supported in the opening by the suspension device 14, which preferably comprises silicon springs structured in the silicon layer. Hence, lateral surfaces 16a and 16b of the oscillating body 10 are arranged in opposed relationship with inner lateral surfaces 18a and 18b of the silicon layer, i.e. the frame layer 12 after the structuring of the silicon layer, in such a way that a kind of plate capacitor is defined therebetween. The suspension device 14, which represents the torsion arms about which the oscillating body 10 can be pivoted, connects the oscillating body 10 on the two sides thereof, which extend at right angles to the lateral surfaces 16a and 16b, with the frame layer 12 in such a way that the lateral surfaces 16a and 16b, which serve as movable electrodes for driving the oscillating body 10, extend substantially at right angles to the plane of the supporting substrate.

In the embodiment shown in FIG. 1, the micromechanical component has been produced from an SOI substrate structure, the silicon layer, in which the frame layer 12 and the oscillating body 10 are structured, being attached to a supporting substrate 22 by means of an insulating layer 20. The supporting substrate 22 and the insulating layer 20 are removed below the opening in the silicon layer in which the oscillating body 10 is formed so that the motion amplitude of the oscillating body 10 will not be impaired by these components. Furthermore, holding device is obtained by the supporting substrate 22 by means of which the micromechanical component can be mounted at its location of use.

The production of the micromechanical component shown in FIG. 1 can be carried out by known methods used in the field of surface micromechanics. No additional mounting or connection techniques or steps are necessary for guaranteeing the functionality of the micromechanical component. A preferred method for producing the micromechanical component according to the present invention starts from an SOI substrate, the epitaxial layer, which is preferably a heavily doped silicon layer, being structured by means of known methods so as to define the oscillating body 10, the suspension 14 and the frame layer 12. During this structuring, the insulating layer 20, which consists preferably of silicon dioxide, can serve as an etch stop. After this structuring of the epitaxial layer, a back etching process is carried out for removing the supporting substrate 22 and the insulating layer at least below the oscillating body 10 so as to guarantee that the motion amplitude of the oscillating body 10 will not be limited by these layers.

In the following, the mode of operation of the of the micromechanical component according to the present invention will be explained making reference to FIGS. 1 and 2. To begin with it is assumed that the oscillating body suspended via the two torsion arms, which define the suspension device 14, is already oscillating. In the non-deflected condition, which is shown in FIG. 1, the systems consisting of a movable electrode 16a and 16b, respectively, and a counterelectrode 18a and 18b, respectively, each have their maximum capacitance $C_0$. As has already been explained hereinbefore, this capacitance is defined by a respective lateral surface 18a or 18b of the opening in the frame layer 12, which acts as a counterelectrode, and a respective lateral surface 16a or 16b of the oscillating body 10, which acts as a movable electrode. In the embodiment shown, two respective ones of these electrodes are directly opposed when the oscillating body is at rest so that the maximum capacitance $C_0$ is defined therebetween.

Figure 2:
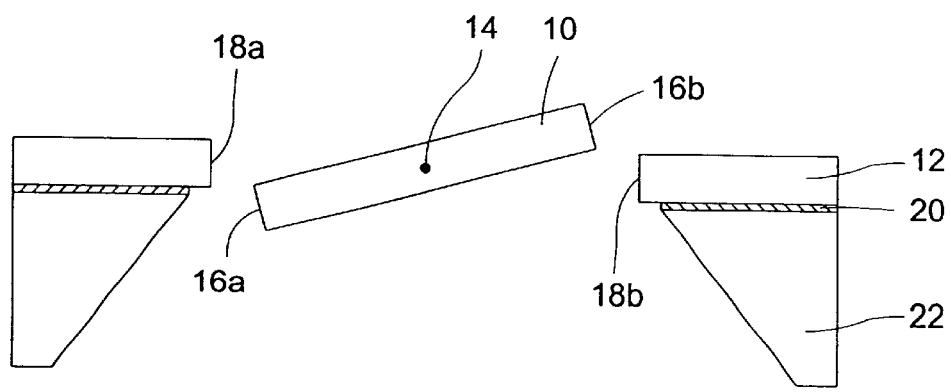
FIG. 2 shows a schematic cross-sectional view of the micromechanical component shown in FIG. 1, the oscillating body being in the deflected condition.

As the deflection increases, in the manner shown in FIG. 2, the capacitance between the electrodes 16a and 18a or 16b and 18b will decrease. It follows that, during oscillation of the oscillating body 10, the system represents a deflection angle-dependent capacitance. When the oscillating body 10 oscillates towards its position of rest, which is shown in FIG. 1, an accelerating moment will act on the oscillating body 10 due to the increase in capacitance between the respective electrodes 16a and 18a or 16b and 18b, provided that an electric voltage is applied between the respective electrodes. When the position of rest has reached by the oscillating body 10, i.e. at zero passage thereof, this voltage applied between the oscillating body 10 and the frame layer 12 is switched to a lower value or switched off so that, when the oscillating body oscillates away from the position of rest, it is, if at all, only a low electric torque which causes a decelerating effect.

The above-described process takes place in each half period of the oscillation of the oscillating body 10. The energy that can be coupled in per half period is proportional to the change in capacitance. Neglecting fringe effects, the capacitance decreases to zero as soon as the oscillating body 10 has a deflection amplitude which is larger than the electrode height, i.e. larger than the height of the lateral surfaces 16a and 16b, respectively, of the oscillating body. It follows that the maximum energy that can be coupled in per period of oscillation is $E=C_0 \cdot U^2$, wherein U is the voltage between the respective electrodes 16a and 18a or 16b and 18b which is switched off at zero passage.

In preferred embodiments of the present invention, the movable electrodes and the respective opposed fixed electrodes are implemented such that a large amount of energy can be coupled in. This can be achieved e.g. on the basis of a comb-shaped or meandrous structural design of the electrodes.

The synchronization of the switch-off time of the electric voltage with the zero passage of the oscillation can be realized either via an optical method, e.g. by scanning by means of a laser beam, via the charge/discharge current occurring when the capacitance changes or via a determination of the instantaneous capacitance.

Alternatively, the oscillation can also be maintained by an alternating voltage having a suitable, but fixed frequency. However, since the phase position is here normally unfavourable, the amount of energy coupled in will be smaller. The excitation frequency need not correspond to the mechanical resonant frequency of the oscillating body. Normally, the excitation frequency will be twice the oscillation frequency, since the oscillating body passes the zero passage twice per period.

Oscillation build-up of the oscillating body of the micromechanical component according to the present invention can be achieved by various possibilities, an initial deflection of the oscillating body 10 being necessary in the case of each of these possibilities. Such a deflection can be produced by a voltage, when the oscillating body is arranged asymmetrically in the production process, by causing the oscillating body to assume a tilted position relative to the frame layer, when it is at the position of rest. Such a tilted position could be produced e.g. by realizing the suspension means in such a way that a certain mechanical pretension is applied to the oscillating body 10.

Figure 3:
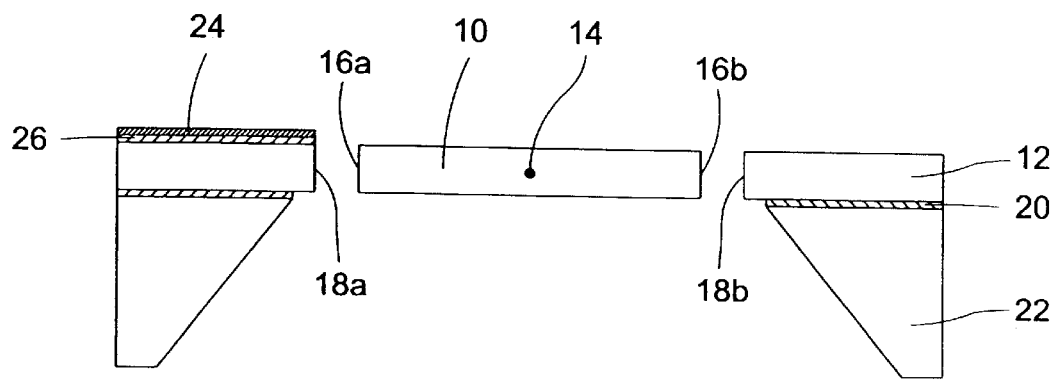
FIG. 3 shows a schematic cross-sectional view of a further embodiment of a micromechanical component according to the present invention, the oscillating body being at the position of rest.
Figure 4:
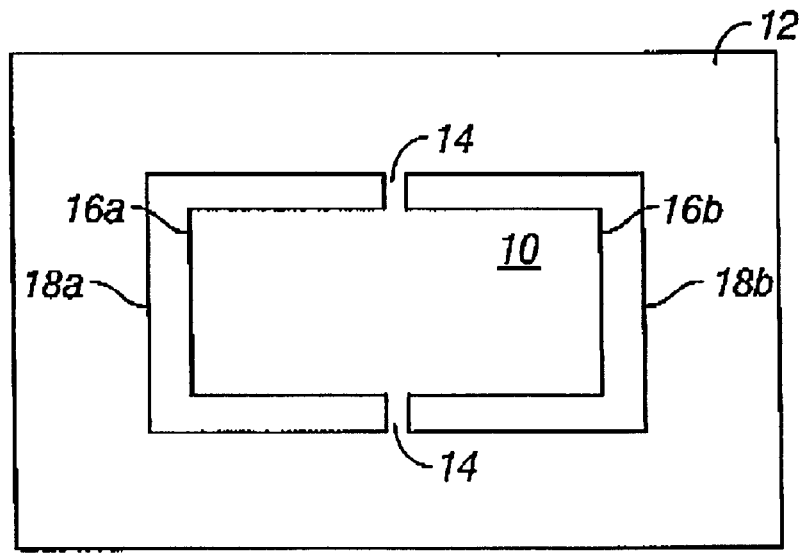
FIG. 4 shows a schematic top view of the micromechanical component shown in FIG. 1.

An alternative embodiment for producing the abovementioned asymmetry is shown in FIG. 3. In this embodiment of the mechanical component a further electrode 24 is provided adjacent the counterelectrode 18a on the frame layer 12; this further electrode 24 is insulated from the frame layer 12 by an insulating layer 26. The insulating layer 26 may be e.g. a glass layer, whereas the additional electrode 24 may consist of metal.

This electrode 24 disturbs the symmetry of the set-up, since it influences the capacitance between the movable electrode 16a and the counterelectrode 18a, i.e. it normally increases this capacitance. Hence, the provision of the counterelectrode 24 above the counterelectrode on one side of the movable element, as shown in FIG. 3, permits an oscillation build-up of the oscillating body 10.

Making reference to a preferred embodiment of the present invention, a micromechanical component has been described in the case of which the oscillating body is supported in the frame layer with the aid of the suspension means in such a way that the oscillation which can be generated is a torsional oscillation. Alternatively, the present invention can, however, also be applied to components in the case of which the oscillating body is fixed by the suspension means in the frame layer on one side thereof in such a way that the oscillation which can be generated is a flexural oscillation.

Figure 6:
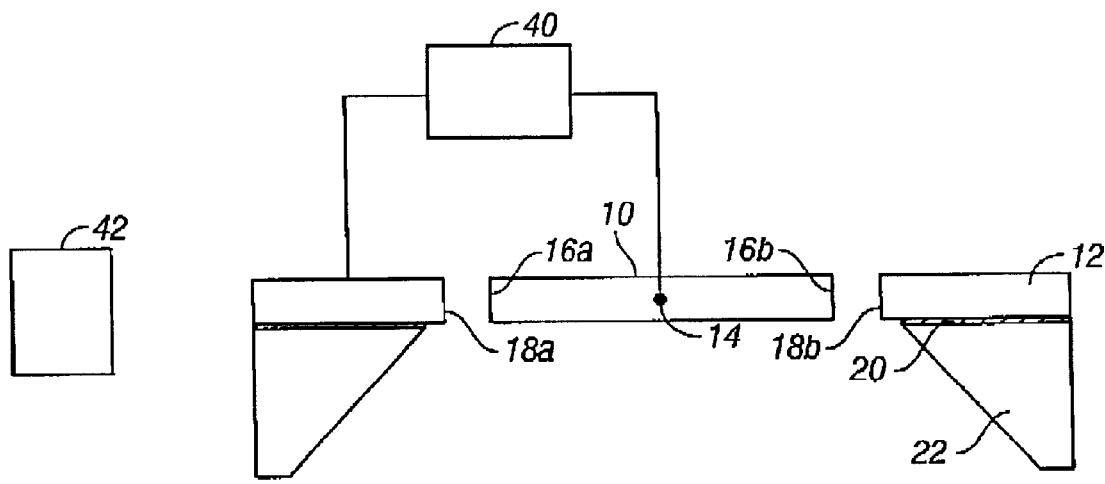
FIG. 6 shows the embodiment of FIG. 1 further showing a voltage source and an optical detector.

In FIG. 6, the micromechanical component of FIG. 1 is shown provided with means 40 for applying an electric voltage between the respective electrode pairs 16a, 18a and 16b, 18b. In addition, an optical detector 42 for detecting a zero passage of the oscillation body is shown in FIG. 6.

Figure 7:
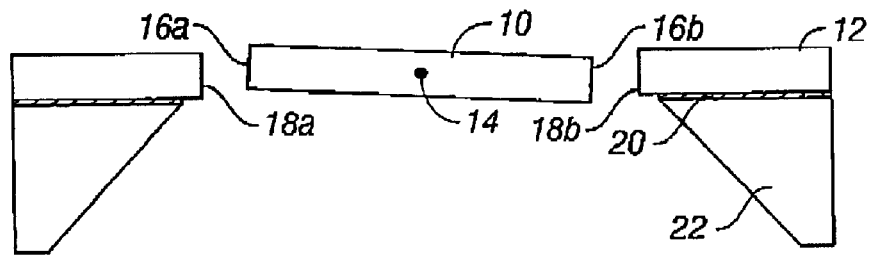
FIG. 7 shows a further embodiment of the invention where the oscillating body 10 assumes a tilted position relative to the frame layer 12 when it is at the position of rest.

FIG. 7 shows an embodiment of the present invention in which the oscillating body 10 assumes a tilted position relative to the frame layer 12 when it is at the position of rest.

Figure 5:
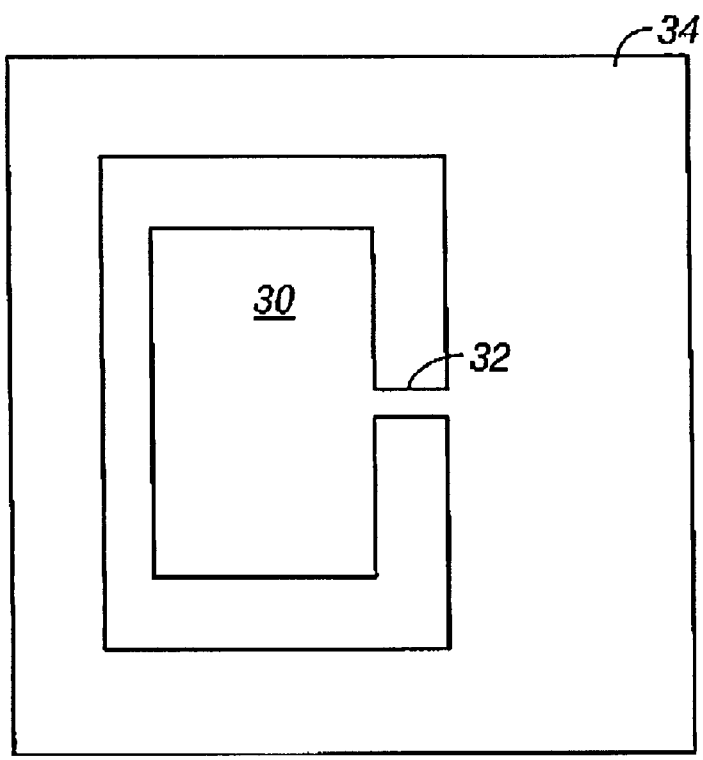
FIG. 5 shows an alternative embodiment of the invention wherein an oscillating body 30 is fixed by a suspension means 32 in a frame layer 34 on one side thereof in such a way that the oscillation which can be generated is a flexural oscillation.

Alternatively, the present invention can, however, also be applied to components in the case of which an oscillating body 30 is fixed by a suspension means 32 in a frame layer 34 on one side thereof in such a way that the oscillation which can be generated is a flexural oscillation. Such an arrangement is shown in FIG. 5.

What is claimed is:

1. A micromechanical component comprising:

a frame layer, an oscillating body which, with the aid of a suspension means, is supported in an opening penetrating the frame layer for being pivoted about an axis of oscillation, at least one oscillating-body lateral surface, which extends substantially at right angles to the frame layer plane, being arranged in relation to at least one inner lateral surface of the opening in such a way that a capacitance formed therebetween is varied by an oscillation of the oscillating body in such a way that an oscillation of the oscillating body about the axis of oscillation can be generated by periodically varying a voltage applied between the frame layer and the oscillating body, and further comprising a supporting substrate for holding the frame layer, said supporting substrate being implemented such that, in comparison with the influence of the voltage applied between the frame layer and the oscillating body, said supporting substrate has a negligible physical influence on the generation of the oscillation of the oscillating body.

2. A micromechanical component according to claim 1, wherein the frame layer, the suspension and the oscillating body are formed integrally with one another.

3. A micromechanical component according to claim 2, wherein the frame layer, the suspension and the oscillating body are made of a heavily doped silicon layer.

4. A micromechanical component according to claim 3, wherein the heavily doped silicon layer is arranged on a supporting substrate by means of an insulating layer, said insulating layer and said supporting substrate being removed at least in the area of the oscillating body.

5. A micromechanical component according to claim 1, wherein the oscillating body is fixed in the frame layer with the aid of the suspension means on one side thereof for being subjected to a flexural oscillation.

6. A micromechanical component according to claim 1, wherein the oscillating body is supported with the aid of the suspension means in the frame layer for being subjected to a torsional oscillation.

7. A micromechanical component according to claim 1, wherein an asymmetry of a setup comprising the frame layer, the oscillating body and the suspension means, so as to permit an oscillation build-up of the oscillating body.

8. A micromechanical component according to claim 7, wherein said asymmetry is caused by an electrode arranged on the frame layer adjacent to an inner lateral surface of the opening and insulated from said frame layer.

9. A micromechanical component according to claim 7, wherein the asymmetry is caused by an asymmetrical structural design of the oscillating body and/or the frame layer.

10. A micromechanical component according to claim 7, wherein the asymmetry is caused in that, at a position of rest of the oscillating body, when no voltage is applied between the frame layer and the oscillating body, said oscillating body is tilted about the axis of oscillation relative to the frame layer.

11. A micromechanical component according to claim 1, comprising means for applying a voltage between the frame layer and the oscillating body, wherein the applied voltage is at a minimum value substantially at each zero passage of the oscillation of the oscillating body.

12. A micromechanical component according to claim 11, wherein said applied voltage is switched off at each zero passage of the oscillation of the oscillating body.

13. A micromechanical component according to claim 11, wherein the voltage applied between the frame layer and the oscillating body is increased to a maximum value at each maximum deflection of the oscillating body.

14. A micromechanical component according to claim 11, additionally comprising means for detecting the zero passages of the oscillation of the oscillating body.

15. A micromechanical component according to claim 14, wherein said detection means comprise an optical detector.

16. A micromechanical component according to claim 14, wherein said detection means comprise at least one means for detecting the capacitance between a lateral surface of the oscillating body and an associated lateral surface of the opening.

17. A micromechanical component according to claim 14, wherein said detection means comprise at least one means for detecting a charge/discharge current of the capacitance between a lateral surface of the oscillating body and an associated inner lateral surface of the opening.

18. A micromechanical component according to claim 11, wherein said means for applying a voltage applies a periodic voltage of a predetermined frequency between the frame layer (12) and the oscillating body (10).

* * * * *

UNITED STATES PATENT AND TRADEMARK OFFICE
CERTIFICATE OF CORRECTION

PATENT NO.    : 6,595,055 B1
DATED         : July 22, 2003
INVENTOR(S)   : Schenk et al.

It is certified that error appears in the above-identified patent and that said Letters Patent is hereby corrected as shown below:

<u>Title page,</u>
Item [74], *Attorney, Agent, or Firm*, replace "Michael A. Glenn; Glen Patent Group" with -- Michael A. Glenn; Glenn Patent Group --

Signed and Sealed this

Fifteenth Day of June, 2004

JON W. DUDAS
*Acting Director of the United States Patent and Trademark Office*